United States Patent [19]
Tanaka et al.

[11] 3,864,619
[45] Feb. 4, 1975

[54] DC TO AC INVERTER WITH THYRISTOR FOR ISOLATING LOAD CIRCUIT FROM COMMUTING REACTOR

[75] Inventors: Shinya Tanaka; Mantaro Nakamura; Kazuo Hirose, all of Niiza, Japan

[73] Assignee: Sanken Electric Company Limited, Saitama-ken, Japan

[22] Filed: Oct. 29, 1973

[21] Appl. No.: 410,514

[30] Foreign Application Priority Data
Nov. 14, 1972 Japan .............................. 47-114085

[52] U.S. Cl. ............... 321/16, 321/45 C, 321/45 ER
[51] Int. Cl. ............................................ H02m 7/52
[58] Field of Search ............ 321/5, 9 R, 45 R, 45 C, 321/45 ER, 16; 307/252 M

[56] References Cited
UNITED STATES PATENTS

| | | | |
|---|---|---|---|
| 3,303,406 | 2/1967 | Bedford | 321/45 R |
| 3,351,841 | 11/1967 | Lipman et al. | 321/45 R |
| 3,544,879 | 12/1970 | King | 321/5 |

FOREIGN PATENTS OR APPLICATIONS

| | | | |
|---|---|---|---|
| 14,499 | 4/1971 | Japan | 321/45 R |
| 264,528 | 3/1970 | U.S.S.R. | 321/5 |

*Primary Examiner*—William H. Beha, Jr.
*Attorney, Agent, or Firm*—Woodcock, Washburn, Kurtz & Mackiewicz

[57] ABSTRACT

In its simplest form, the inverter includes a series circuit of first and second thyristors and a commuting reactor interposed therebetween, which series circuit is connected across the positive and negative terminals of a DC supply system. The DC supply system is further provided with a neutral terminal which is connected to one of the terminals of a load circuit. A third thyristor is connected between the first thyristor and the other terminal of the load circuit, and a fourth thyristor between the second thyristor and the said other terminal of the load circuit, so that the commuting reactor is isolated from the load circuit by the third and fourth thyristors.

10 Claims, 33 Drawing Figures

FIG.3G $\theta$ $\alpha$
t1 t2 t3 t4

0° 60° 120° 180° 240° 270° 360°
⎯→ Time

DC TO AC INVERTER WITH THYRISTOR FOR ISOLATING LOAD CIRCUIT FROM COMMUTING REACTOR

BACKGROUND OF THE INVENTION

This invention relates generally to inverters, and more specifically to an inverter incorporating thyristors for DC to AC power conversion.

There have been known varieties of thyristor inverters. According to a typical example of such prior art thyristor inverters, a pair of thyristors are serially connected across the positive and negative terminals of a DC supply system, and a commuting reactor interposed between the pair of thyristors has a center tapped winding both extremities of which are connected to the anode and cathode electrodes of the respective thyristors. A load circuit usually including an output transformer is connected between the center tap terminal of the commuting reactor winding and a neutral terminal of the DC supply system, and a commuting capacitor is further connected in parallel with the load circuit. Thus, by alternately causing conduction through the aforesaid pair of thyristors, the desired AC power can be delivered to the load circuit. When conduction is initiated through one of the thyristors while the other thyristor is still conductive, the commuting capacitor and the commuting reactor so function as to commute the said other thyristor.

The prior art thyristor inverter circuit described above is disadvantageous in that the commuting reactor is required to have sufficient capacity to withstand the flow of load current through its winding. It will be apparent that the inverter employing a commuting reactor of such high current-carrying capacity is inconveniently bulky in size. Moreover, since the commuting reactor in the prior art thyristor inverter circuit usually has a gap formed in its core, excessive noise is produced during operation of the circuit.

SUMMARY OF THE INVENTION

In view of the listed disadvantaages of the prior art, it is an object of this invention to provide a thyristor inverter circuit which is simple and inexpensive in construction and highly compact in size since the current-carrying capacity of the commuting reactor in use is drastically reduced without any adverse effects on the operation of the inverter circuit.

Another object of the invention is to provide a thyristor inverter such that the core of the commuting reactor winding has no gap formed therein so that no excessive noise is produced during its operation.

A further object of the invention is to provide a thyristor inverter such that the fluctuations of the output voltage are minimized.

A further object of the invention is to provide a thyristor inverter such that the durations of its output pulses can easily be regulated by impressing gate signals to the respective thyristors in use in a controlled manner.

A still further object of the invention is to provide a thyristor inverter which is easily adaptable for use either as a single-phase or as a polyphase apparatus.

According to the fundamental concepts of this invention, the inverter circuit includes a commuting reactor and first and second thyristors connected in series therewith across the positive and negative terminals of a DC supply system. A load circuit to be fed with AC power has its first terminal connected to a neutral terminal of the DC supply system. A third thyristor is connected between the first thyristor and a second terminal of the load circuit, and a fourth thyristor is connected between the second thyristor and the second terminal of the load circuit.

Upon conduction of the first and third thyristors, the current flows from the positive terminal to the neutral terminal through the first and third thyristors and the load circuit, and upon conduction of the second and fourth thyristors the current flows from the neutral to the negative terminals through the load circuit and the second and fourth thyristors. The flow of load current through the commuting reactor is thus substantially avoided. The commutation of each of the first and second thyristors can be accomplished unfailingly upon conduction of the other of these thyristors.

The features which are believed to be novel and characteristic of this invention are set forth with particularity in the appended claims. The invention itself, however, both as to its organization and mode of operation, together with the further objects and advantages thereof, will be best understood from the following description taken in conjunction with the accompanying drawings in which like reference characters denote like circuit elements or components throughout the several views.

BRIEF DESCRIPTION OF THE DRAWINGS

FIGS. 3A to 3G inclusive are graphic representations of gate signals impressed to the thyristors in the inverter circuit of FIG. 2 and of the corresponding output voltage applied to the load circuit, the gate signals being adapted to control the pulse durations of the output voltage;

FIG. 4 is also a graphic representation of pulse signals adapted to control the pulse durations of the output voltage in the inverter circuit of FIG. 2;

DESCRIPTION OF THE PREFERRED EMBODIMENTS

Figure 1:
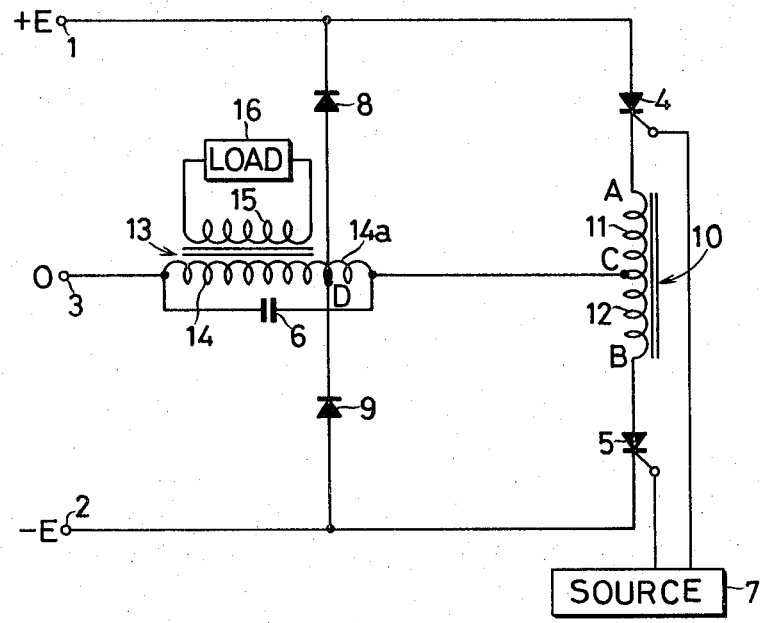
FIG. 1 is a schematic electrical diagram of a prior art thyristor inverter circuit.

Prior to the description of some preferred embodiments of this invention, it is considered essential that the configuration and operation of a prior art thyristor inverter circuit, together with its accompanying disadvantages, be set forth in further detail in order to make clear the features and advantages of the invention. The typical prior art thyristor inverter circuit illustrated in FIG. 1 includes a positive input terminal 1, a negative input terminal 2 and a neutral input terminal 3 which are connected to a DC supply system not shown in the drawing. Connected across the positive and the negative input terminals 1 and 2 is a series circuit of a pair of reverse blocking triode thyristors 4 and 5 and a commuting reactor 10. The commuting reactor 10 includes a winding which is center tapped at C to substantially divide the reactor winding into a first half 11 and a second half 12.

The center tap C of the commuting reactor winding is connected to an output transformer 13 and thence to the neutral terminal 3. The output transformer 13 has its primary 14 connected in parallel with a commuting capacitor 6 and its secondary 15 with an electrical load 16 to be fed with AC power. A feedback diode 8 is connected between a tap D of the transformer primary 14 and the positive input terminal 1, while another feedback diode 9 is connected between the tap D and the negative input terminal 2.

In the operation of this prior art inverter circuit, gate signals are delivered from their source 7 to the gate terminals of the thyristors 4 and 5. When, for example, the thyristor 4 is thus gated conductive while the other thyristor 5 in nonconductive, a current flows from the positive terminal 1 to the neutral terminal 3 through a path including the thyristor 4, the first reactor winding half 11, and the transformer primary 14. As the current thus flows from the right to the left, as seen in FIG. 1, of the transformer primary 14, a corresponding current flow through the load 16 connected to its secondary 15. Simultaneously, the capacitor 6 connected in parallel with the transformer primary 14 is charged to approximately E volts.

As a gate signal is succeedingly impressed from its source 7 to the gate electrode of the thyristor 5 to initiate conduction therethrough, the extremity B of the reactor winding assumes a potential of $-E$ volts. The sum, $2E$, of the potential at the reactor winding extremity B and the potential stored as aforesaid in the commuting capacitor 6 is applied to the second half 12 of the reactor winding. The voltage of $2E$ volts resultantly induced in the first reactor winding half 11 is effective to reverse bias the thyristor 4 and hence to render the same nonconductive. The energy released from the capacitor 6 is delivered to the commuting circuit and the load, and the energy of the commuting circuit including the second reactor winding half 12 and the thyristor 5 is fed back to the DC supply system through a path including the feedback diode 9 and a feedback winding 14a formed by a fraction of the transformer primary 14.

Thereafter, the current flows from the neutral terminal 3 to the negative terminal 2 through a path formed by the transformer primary 14, the second reactor winding half 12, and the thyristor 5. As the current thus flows from the left to the right of the transformer primary 14, a corresponding current likewise flows through the load 16. Thus, by alternately causing conduction through the thyristors 4 and 5, the desired AC power can be supplied to the load 16.

This type of prior art thyristor inverter circuit has an intrinsic disadvantage in that the commuting reactor 10 is usually of such large capacity that the inverter device as a whole is made inconveniently bulky in size. This is because, since the reactor is serially connected with the thyristors 4 and 5, it is required to have sufficient capacity to withstand the load current which flows inevitably through its winding. Another disadvantage resides in excessive noise produced largely as a result of a gap formed in the commuting reactor core to permit the flow of direct current through its winding halves 11 and 12.

As a further disadvantage, the provision of the feedback winding 14a in accordance with the prior art has resulted in the fluctuations of the output voltage with load fluctuations. For example, when the thyristor 4 is nonconductive and the thyristor 5 conductive, the energy stored in the second reactor winding half 12 is usually released through the thyristor 5, the feedback diode 9, and the feedback winding 14a. The point D of the circuit thus assumes a potential of $-E$ volts, and the output voltage then can be defined by the formula $-(E/2 \cdot 1/1-n)$, where $n$ represents the number of the turns of the feedback winding. However, since the feedback current is subject to change depending upon load conditions, the waveform of the output voltage also changes. Especially under heavy load the flow of substantially no feedback current takes place thereby resulting in the decrease in the output voltage. While this defect can be circumvented by making $n$ zero, that is, by eliminating the feedback winding 14a, then the energy one-half $LI^2$ stored in the second reactor winding half 12 having the reactance L cannot be fed back to the DC supply system. The resulting commutation loss is by no means negligible since the current I has a value approximately equal to that of the load current so that the aforesaid energy stored in the reactor winding half is considerably high. It will accordingly be understood that the provision of the feedback winding has been a requisite in the prior art thyristor inverter circuit even though it accompanies output voltage fluctuations. It is an additional disadvantage of the prior art that the output transformer 13 must also be of sufficiently large capacity to permit the flow of the sum of the load current and the commuting current through the feedback winding.

A preferrred embodiment of this invention will now be described with reference to FIG. 2. A positive input terminal 21, a negative input terminal 22 and a neutral input terminal 23 of the exemplified thyristor inverter circuit are connected as in the drawing to a DC supply system consisting of DC sources 39 and 40. As in the prior art circuit of FIG. 1, a series circuit including a pair of reverse blocking triode thyristors 24 and 25 and a commuting reactor 30 therebetween is connected across the positive and the negative input terminals 21 and 22. The commuting reactor 30 has its winding center tapped at C for connection via a commuting capacitor 26 to one extremity of the primary 34 of an output transformer 33 which constitutes a part of a load circuit as its secondary 35 is connected to an electrical load 36. The aforesaid one extremity of the transformer primary 34 is further connected to the neutral input terminal 23. It will be understood that the provision of this output transformer is not of absolute necessity.

A thyristor 37 is connected between one extremity A of the reactor winding and the other extremity D of the transformer primary 34, while a thyristor 38 is connected between the other extremity B of the reactor winding and the exremity D of the transformer primary 34. As will be seen from the drawing, the thyristors 37 and 38 are connected with their anode and cathode electrodes disposed in opposite directions. The gate electrodes of the thyristors 24, 25, 37 and 38 are connected to a source 27 of gate signals. A diode 28 is connected between the point D and the positive input terminal 21 substantially in parallel relationship to the thyristor 24, and another diode 29 is connected between the negative input terminal 22 and the point D substantially in parallel relationship to the thyristor 25. It will also be seen from the drawing that the directions of current flow through the thyristor 24 and the diode 28 and through the thyristor 25 and the diode 29 are opposed to each other.

Figure 2:
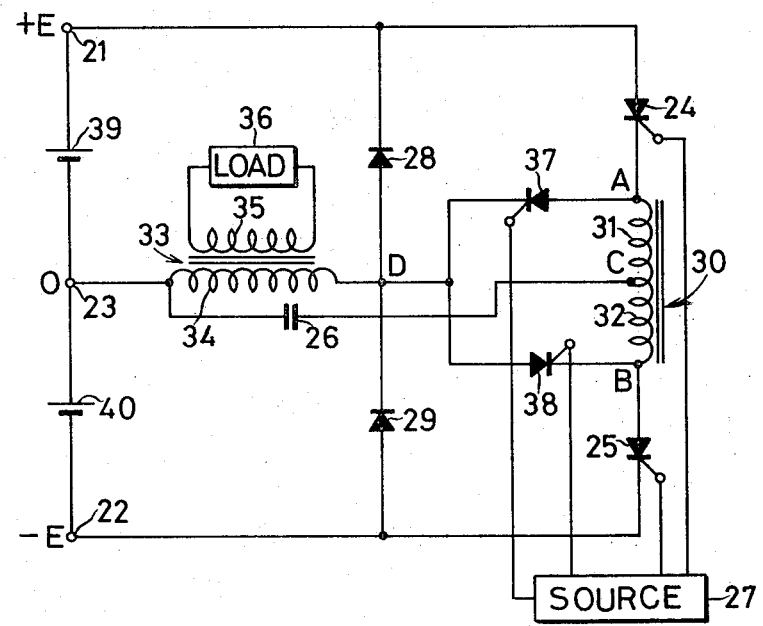
FIG. 2 is a schematic electrical diagram of a thyristor inverter circuit in accordance with the novel concepts of this invention.

In order to control the operation of the thyristor inverter circuit described hereinbefore with reference to FIG. 2, gate signals from their source 27 are impressed at prescribed time intervals to the gate electrodes of the thyristors 24, 37, 25 and 38, in that order, while at the same time the DC voltage of +E volts is being delivered from the DC supply system. When the thyristors 24 and 37 are successively gated conductive, the current flows from the positive terminal 21 to the neutral terminal 23 through a path which includes the thyristor 24, the thyristor 37, and the load circuit.

The thyristor 25 is succeedingly gated conductive with the result that the conduction of the thyristor 24 is terminated. Thereafter, as the thyristor 38 is also gated conductive, the flow of current is initiated from the neutral terminal 23 to the negative terminal 22 through the load circuit and the thyristors 38 and 25. In this manner the current from the DC supply system flows through the primary 34 of the output transformer 33 in alternately reversed directions so that the load 36 can be fed with the required AC power.

Proceeding to the description of more detailed operation of the circuit of FIG. 2, it is assumed that the thyristor 24 is now gated conductive while all the other thyristors 25, 37 and 38 are nonconductive. The capacitor 26 is then charged to E volts by the current flowing from the positive terminal 21 to the neutral terminal 23 through a path including the thyristor 24, the first half 31 of the commuting reactor winding, and the capacitor 26. As conduction is succeedingly initiated through the thyristor 37 while the thyristor 24 is held conductive, the current flows as aforesaid from the positive to the neutral terminal through the path formed of the thyristor 24, the thyristor 37, and the transformer primary 34, thereby feeding the load 36.

Thereafter, upon conduction of the thyristor 25, there is completed a circuit including the capacitor 26, the second reactor winding half 32, the thyristor 25, and the negative terminal 22, with the result that a voltage of 2E volts is applied across both extremities B and C of the second reactor winding half 32. As a consequence, a voltage of 2E volts is electromagnetically induced in the first reactor winding half 31. The potential at the point A thus becomes higher than the potential at the positive terminal 21, so that the diode 28 connected to the point A via the thyristor 37 is forward biased. It will accordingly be understood that the energy which has been stored in the capacitor 26 is fed back to the DC source 39 through a path including the first reactor winding half 31, the thyristor 37, and the diode 28. The commutation of the thyristor 24 is accomplished in the meantime as the same is reverse biased due to the forward voltage drop across the thyristor 37 and the diode 28.

Upon completion of the discharge of the capacitor 26, the current flows from the neutral terminal 23 to the negative terminal 22 through the capacitor 26, the second reactor winding half 32, and the thyristor 25, as previously mentioned, so that the capacitor is recharged by the DC source 40 in the opposite direction. As the thyristor 38 is succeedingly gated conductive at an appropriate instant, the load current flows through the circuit composed of the DC source 40, the neutral terminal 23, the transformer primary 34, the thyristor 38, the thyristor 25, and the negative terminal 22. In the meantime the thyristor 37 is automatically rendered nonconductive upon termination of the conduction of the thyristor 24. It is possible that the thyristor 38 be gated conductive during conduction of the thyristor 37.

The thyristor 24 is then gated conductive again so that there is completed the circuit including the positive terminal 21, the thyristor 24, the first reactor winding half 31, and the capacitor 26. A voltage of 2E volts thus developes across the extremties A and C of the first reactor winding half 31. Since a corresponding voltage is resultantly induced in the second reactor winding half 32, the diode 29 permits the flow of the feedback current therethrough as then the diode is rendered conductive by being forward biased through the circuit including the negative terminal 22, the diode 29, the thyristor 38, and the point B. The thyristor 25 is then reverse biased for commutation.

The DC to AC power conversion according to the novel concepts of this invention is accomplished by the repetition of the foregoing cycle of operation. It will be appreciated that substantially no load current flows through the center tapped winding of the commuting reactor 30. Since the only current flowing through the commuting reactor winding is that charging, or discharged from, the capacitor 26, the reactor is required to have sufficient capacity to carry only about one tenth the load current. That is to say that the current carrying capacity of the commuting reactor used in the thyristor inverter circuit of this invention is reduced to about one tenth that of the commuting reactor in the usual inverter circuit of prior arrangement.

Moreover, since no substantial load current flows through the commuting reactor winding as previously mentioned, the terminal voltage of this reactor becomes zero upon completion of the charging or discharging of the capacitor 26. Further, if required, either of the thyristors 37 and 38 can be gated conductive before termination of conduction through the other of these thyristors, thereby substantially short circuiting the commuting reactor 30. It will accordingly be understood that no gap need be formed in the core of the commuting reactor because the same is not held excited with direct current like that in the prior art inverter circuit previously set forth. No substantial noise is therefore produced by the thyristor inverter circuit of this invention. Also as previously stated, the feedback of energy to the DC supply system at the times of commutation can be accomplished without the feedback winding 14a provided in the prior art circuit of FIG. 1, so that voltage fluctuations under fluctuating load conditions are minimized as there is no voltage drop caused by such feedback winding.

Another preferred embodiment of the invention described hereinbelow in connection principally with FIGS. 3A to 3G has exactly the same circuit configuration as that shown in FIG. 2. However, according to this second embodiment, the pulse durations of the alternating voltage supplied to the load 36 is regulated in order to deliver controlled electrical energy thereto. To this end the four thyristors 24, 25, 37 and 38 provided in the inverter circuit of FIG. 2 are supplied with gate signals as graphically represented in FIGS. 3A to 3D, respectively, from the source 27 of such gate signals.

By impressing these gate signals to the respective thyristors, the thyristor 24 is rendered conductive at instant $t1$ and the thyristor 37 at instant $t2$. The thyristor 25 is rendered conductive at succeeding instant $t3$ thereby terminating conduction through the thyristor 24. The thyristor 38 is finally rendered conductive at instant $t4$. The current thus permitted to flow through the thyristor 37 is as graphically represented in FIG. 3E, the current permitted to flow through the thyristor 38 as graphically represented in FIG. 3F, and the alternating voltage resultantly impressed to the load 36 as graphically represented in FIG. 3G. In this manner, by impressing the gate signals to the thyristors 37 and 38 at different instants, the pulse durations of the output voltage, indicated by the electrical angle $\alpha$ in FIG. 3G, can be controlled correspondingly. Further, if the angle $\theta$ also indicated in FIG. 3G is set at 60°, the third harmonic becomes zero, so that the function of a filter which may be provided between the transformer secondary 35 and the load 36 becomes less important.

Similar control of the output voltage can also be accomplished by gate signals having the waveform as shown in FIG. 4. The upper portion of each pulse in FIG. 4 is impressed to the thyristor 37, and the lower portion to the thyristor 38. Furthermore, for the same purpose of output voltage control, the gate signals consisting of pulses which are produced alternately like those depicted in FIGS. 3A and 3B may be impressed to the thyristors 24 and 25, while signals of much shorter pulse durations are impressed in a controlled manner to the thyristors 37 and 38. It is to be understood that the output voltage from the thyristor inverter circuit according to the invention can be controlled in a similar manner throughout the several preferred embodiments thereof hereinafter disclosed.

Figure 5:
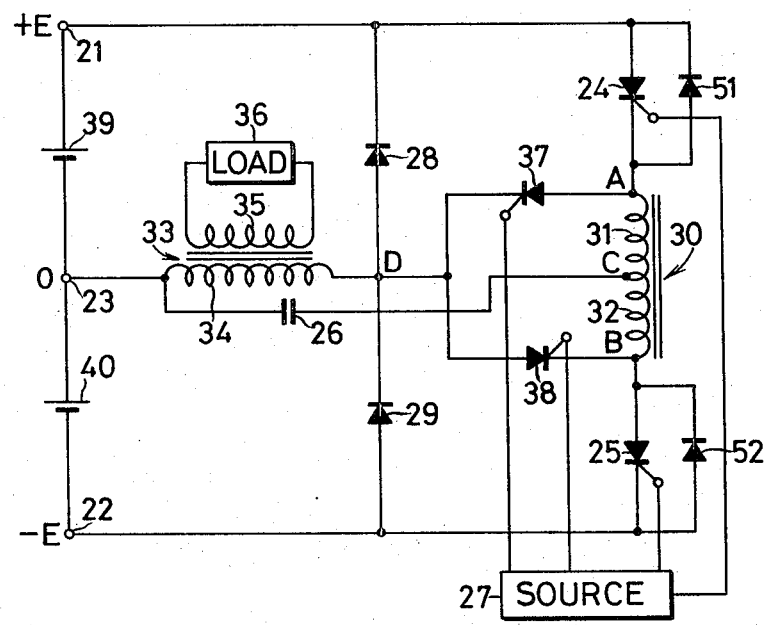
FIG. 5 is a schematic electrical diagram of a further preferred embodiment of the invention.

A further preferred embodiment of the invention is illustrated in FIG. 5, in which diodes 51 and 52 are connected in parallel with the thyristors 24 and 25 respectively, in such a fashion that the directions of current flow through the thyristor 24 and the diode 51 and through the thyristor 25 and the diode 52 are opposed to each other. Other details of the circuit configuration are exactly as illustrated in FIG. 2. These diodes 51 and 52 function as follows to obviate the commutation losses which may take place in event the thyristor 37 or 38 is rendered nonconductive before completion of the energy exchange of the capacitor 26 in the circuit of FIG. 2.

Let it be assumed that the thyristors 24 and 37 are now conductive, and the thyristors 25 and 38 nonconductive, and that energy is stored in the capacitor 26. If then the thyristor 25 is gated conductive, there is completed the circuit including the capacitor 26, the second reactor winding half 32, and the thyristor 25, with the result that a positive voltage is electromagnetically induced in the first reactor winding half 31. As the diode 51 is resultantly forward biased, the current is permitted to flow both through the circuit including the first reactor winding half 31, the diode 51, the positive terminal 21 and the DC source 39, and through the circuit including the first reactor winding half 31, the thyristor 37, the diode 28, the positive terminal 21 and the DC source 39. The thyristor 24 is then rendered nonconductive by being reverse biased due to the forward voltage drop across the diode 51. In this manner, even if the conduction of the thyristor 37 or 38 is terminated prematurely, the energy which has been stored on the capacitor 26 can be fed back to the DC supply system through the circuit formed as aforesaid either by the diode 51 or 52, and the thyristor 24 or 25 can further be reverse biased for commutation.

Figure 6:
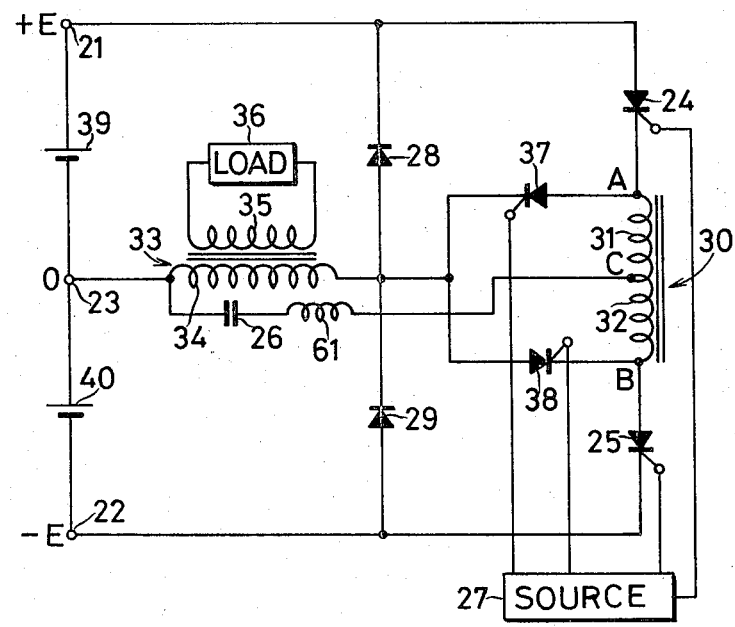
FIG. 6 is a schematic electrical diagram of a further preferred embodiment of the invention.
Figure 11:
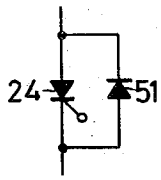
FIGS. 11 to 21 inclusive are partial schematic electrical diagrams showing alternative circuit arrangements according to the invention.
Figure 12:
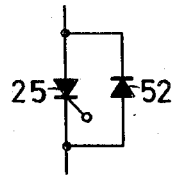
Figure 13:
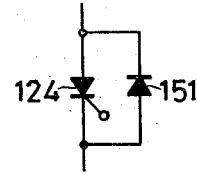
Figure 14:
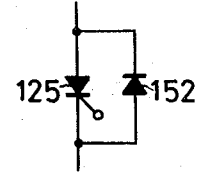
Figure 15:
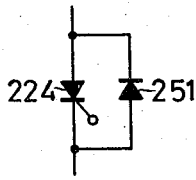
Figure 16:
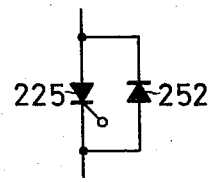
Figure 17:
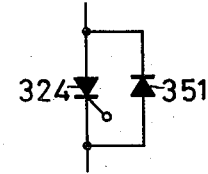
Figure 18:
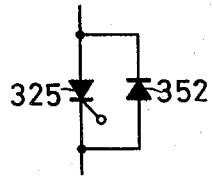

FIG. 6 illustrates a further preferred embodiment of the invention, in which a reactor winding 61 is serially connected between the capacitor 26 and the center tap terminal C of the winding of the commuting reactor 30 in order to permit the reverse biasing voltage to be applied to the thyristors 24 and 25 for sufficiently long period of time, as compared with the FIG. 2 embodiment in which the required reverse biasing time for commutation of the thyristors 24 and 25 is obtained by decreasing the degree of coupling of the reactor winding halves 31 and 32. If the thyristors 24 and 37 are now assumed to be both conductive and the thyristors 25 and 38 both nonconductive, and if conduction is then initiated through the thyristor 25, then it will be seen that the capacitor 26 is caused to discharge through the circuit including the reactor winding 61 serially connected therewith, resulting in complete commutation of the thyristor 24. It will be apparent that the other thyristor 25 can also be completely commuted through a similar process. As in the FIG. 5 embodiment, the diodes 51 and 52 can be connected in parallel with the thyristors 24 and 25 respectively as illustrated in FIGS. 11 and 12.

Figure 7:
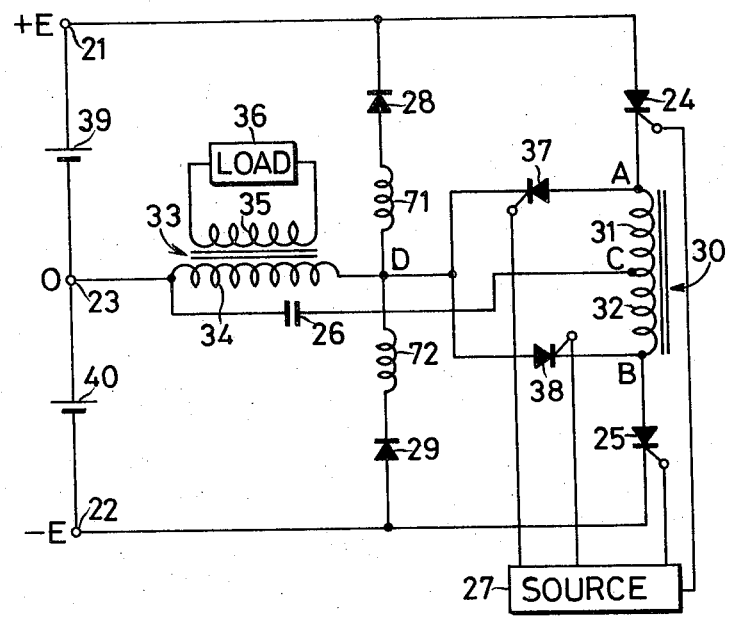
FIG. 7 is a schematic electrical diagram of a further preferred embodiment of the invention.

In a further preferred embodiment of the invention illustrated in FIG. 7, the complete commutation of the thyristors 24 and 25 is accomplished by the provision of reactor windings 71 and 72 connected in series with the diodes 28 and 29 respectively. Other details of circuit configuration and operation are exactly as set forth hereinbefore in connection with the preceding embodiments. In this embodiment of FIG. 7, too, the diodes 51 and 52 can be connected in parallel with the thyristors 24 and 25 respectively as illustrated in FIGS. 11 and 12.

Figure 8:
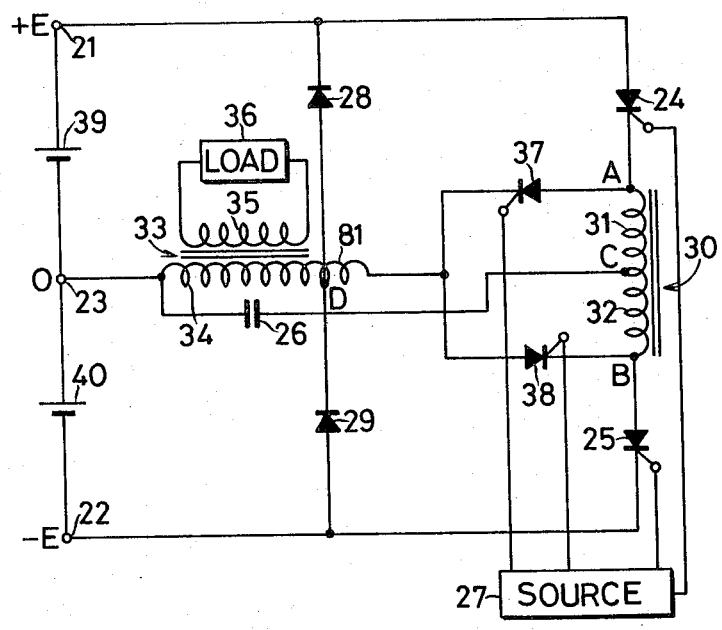
FIG. 8 is a schematic electrical diagram of a further preferred embodiment of the invention.
Figure 19:
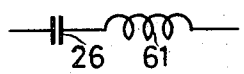

A further preferred embodiment of the invention shown in FIG. 8 is such that the diodes 28 and 29 are connected directly to the primary 34 of the output transformer 33 intermediate between both extremities thereof. A fraction 81 thus set off from the rest of the transformer primary 34 is adapted to improve the feedback function of the diodes 28 and 29. It will be understood that in this embodient, too, the diodes 51 and 52 can be connected in parallel with the thyristors 24 and 25 respectively as shown in FIGS. 11 and 12, and that the reactor 61 set forth in connection with the FIG. 6 embodiment can be connected in series with the capacitor 26 as shown in FIG. 19.

Figure 9:
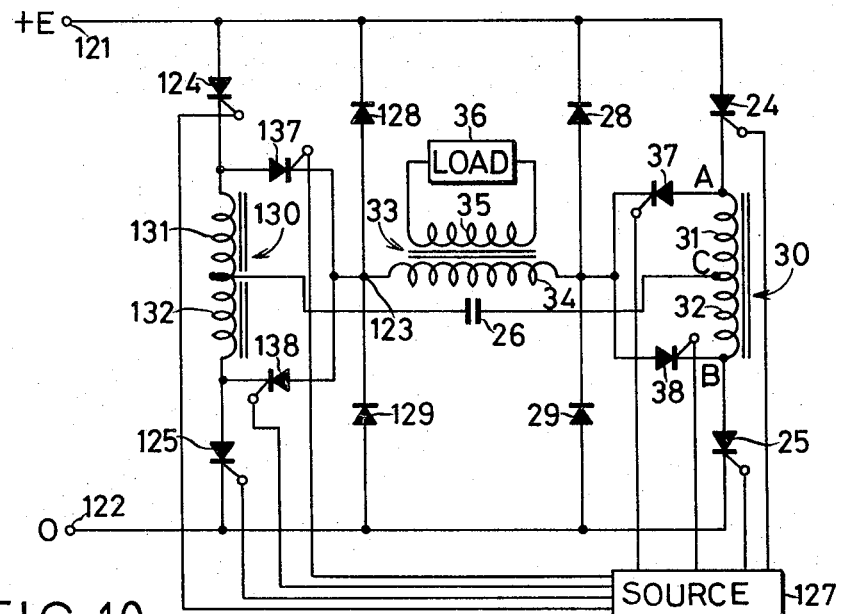
FIG. 9 is a schematic electrical diagram of a further preferred embodiment in which the invention is adapted for a bridge inverter.

FIG. 9 illustrates a further preferred embodiment in which the inventive concepts are adapted for a bridge inverter incorporating thyristors arranged in bridge connection across a positive DC input terminal 121 and neutral terminal 122. The elements in the right hand half of the bridge inverter circuit shown in FIG. 9 are arranged in substantially the same way as in the circuit of FIG. 2 and are therefore designated by the same reference characters as those used for the corresponding elements in the FIG. 2 embodiment. The arrangement in the left hand half of the bridge inverter circuit is also substantially the same as that in the right hand half.

More specifically, the left hand half of the bridge inverter circuit includes a pair of thyristors 124 and 125 connected in series with the halves 131 and 132, respectively. of the center tapped winding of a commuting reactor 130. Both extremities of the reactor winding are further connected at 123 to the primary 34 of the output transformer 33 via thyristors 137 and 138 respectively. The gate electrodes of all these thyristors 124, 125, 137 and 138 are connected to a source 127 of gate signals, to which are also connected the gate electrodes of the thyristors 24, 25, 37 and 38. The center tap terminal of the reactor winding is connected to the capacitor 26. A diode 128 is connected between the point 123 and the positive terminal 121, and a diode 129 between the point 123 and the neutral terminal 122.

In operation, the thyristors 24 and 125 are first gated conductive, and the thyristors 37 and 138 are succeedingly gated conductive. As a consequence, the current flows from the positive terminal 121 to the neutral terminal 122 through a path which includes the thyristor 24, the thyristor 37, the primary 34 of the output transformer 33, the thyristor 138, and the thyristor 125. It will be noted that the current thus flows from the right to the left of the transformer primary 34.

The gate signals from their source 127 are then impressed to the thyristors 25 and 124 either simultaneously or at a time interval. Upon conduction of the thyristor 25 the thyristor 24 is rendered nonconductive, and upon conduction of the thyristor 124 the thyristor 125 is likewise rendered nonconductive. The mode of such commutation of the thyristors is exactly as set forth previously with relation to FIG. 2. The thyristors 38 and 137 are succeedingly gated conductive, whereupon the current starts flowing from the positive terminal 121 to the neutral terminal 122 through a path which includes the thyristor 124, the thyristor 137, the point 123, the transformer primary 34, the thyristor 38, and the thyristor 25. The current thus flows from the left to the right of the transformer primary. It will accordingly be understood that the desired AC power can be supplied to the load 26 by the repetition of the above described cycle of operation.

The durations of the output pulses from this bridge inverter cirucuit can be controlled in several ways. For example, as has been practised conventionally with this type of inverter circuit, the thyristors 24 and 125 may be gated conductive at a certain time interval. Alternatively, the thyristors 24 and 125 and the thyristors 25 and 124 may be supplied with periodically changing gate signals; while the thyristors 37 and 138 and the thyristors 38 and 137 are supplied with variable gate signals in a controlled manner.

It will be apparent that the various advantages of the invention set forth with relation to the precedingly disclosed embodiments are also gained by this bridge inverter circuit. As an additional advantage the operation of the bridge inverter circuit according to the invention can be stopped very easily. Heretofore, in order to stop the operation of the bridge inverter circuit of this class, it has been necessary, for example, to initiate conduction through the thyristor 24 while the thyristors 25 and 124 are still conductive, and to suspend the application of the gate signal to the thyristor 125 to allow the thyristors 24 and 124 to become automatically nonconductive. The source 127 of such gate signals has had to be equipped with a control of very complex configuration to stop the operation of the prior art bridge inverter circuit in the fashion described.

Contrastively, according to this invention, it is only necessary to initiate conduction through the thyristor 24 or 125, for example, while the thyristors 25, 124 and 138 are conductive, and then to suspend the application of the gate signals to the thyristor 37 or 138. In this bridge inverter circuit of FIG. 9, too, the diodes 51, 52, 151 and 152 can be connected in parallel with the respective thyristors 24, 25, 124 and 125 as shown in FIGS. 11 to 14, and the reactor winding 61 can be connected in series with the capacitor 61 as shown in FIG. 19.

Figure 10:
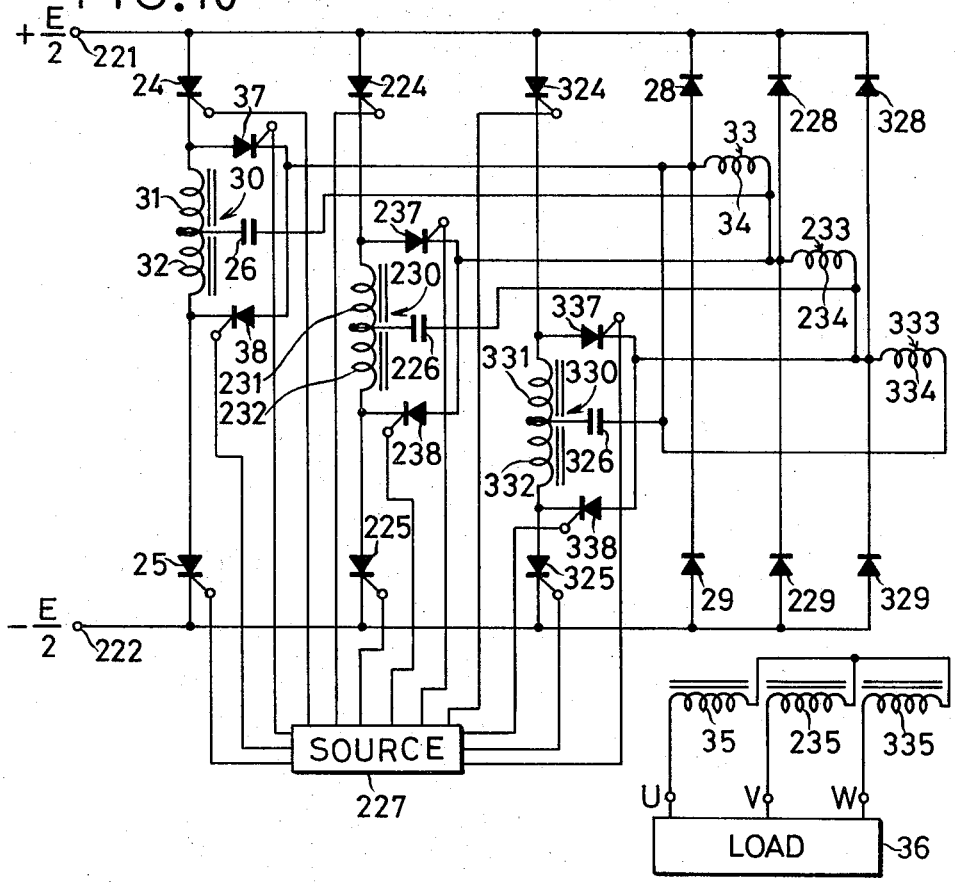
FIG. 10 is a schematic electrical diagram of a further preferred embodiment in which the invention is adapted for a three-phase inverter.

In a further preferred embodiment illustrated in FIG. 10 the invention is adapted for a three-phase inverter incorporating three inverter circuits of FIG. 2. The elements in the first phase of this three-phase inverter circuit which correspond to the elements of the FIG. 2 embodiment are therefore designated by like reference numerals. The second and the third phase of the circuit are also of substantially the same circuit configuration as the first phase.

The second phase of the three-phase bridge inverter circuit comprises a pair of thyristors 224 and 225 connected in series with the respective halves 231 and 232 of the center tapped winding of a commuting reactor 230. The center tap terminal of the reactor winding is connected via a capacitor 226 to one of the extremities of the primary 234 of an output transformer 233, and both extremities of the reactor winding are connected via thyristors 237 and 238, respectively, to the other extremity of the transformer primary 234. A diode 228 is connected between the said other extremity of the transformer primary 234 and a positive DC input terminal 221, and a diode 229 is connected between the same extremity of the transformer primary 234 and a negative DC input terminal 222.

The third phase of the three-phase bridge inverter circuit also comprises a pair of thyristors 324 and 325 connected in series with the respective halves 331 and 332 of the center tapped winding of a commuting reactor 330. The center tap terminal of the reactor winding is connected via a capacitor 326 to one of the extremities of the primary 334 of an output transformer 333, and both extremities of the reactor winding are connected via thyristors 337 and 338, respectively, to the other extremity of the transformer primary 334. A diode 328 is connected between the said other extremity of the transformer primary 334 and the positive terminal 221, and a diode 329 is connected between the same extremity of the transformer primary and the negative terminal 222.

The output transformers 33, 233 and 333 are interconnected as in the drawing, and the secondaries 35, 235 and 335 of these output transformers are connected to the three-phase load 36 at terminals U, V and W respectively. The gate electrodes of all the thyristors used in the circuit of FIG. 10 are connected to a source 227 of gate signals.

The operation of this three-phase bridge inverter circuit is controlled by gate signals as graphically represented in FIGS. 22A to 22F. The gate signal of FIG. 22A is first impressed to the thyristors 24 and 37 to render the same conductive. Then, at the instant of 120 electrical degrees, the gate signal of FIG. 22B is impressed to the thyristors 224 and 237 to render the same conductive. The gate signal of FIG. 22C is further impressed to the thyristors 324 and 337 to render the same conductive at 240 electrical degrees. The conduction of the thyristor 24 is terminated upon initiation of conduction through the thyristor 25 by the application of the gate signal shown in FIG. 22D, and the conduction of the thyristors 224 and 324 is terminated upon initiation of conduction through the thyristors 255 and 325, respectively, by the application of the gate signals shown in FIGS. 22E and 22F.

Figure 20:
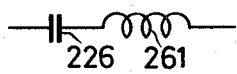
Figure 21:
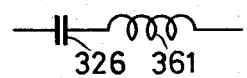

By thus impressing the gate signals to the respective thyristors with a phase difference of 120 electrical degrees, the primaries 34, 234 and 334 of the output transformers connected to the load 36 can be supplied with three-phase AC power. It will be understood that the durations of the output pulses from this three-phase bridge inverter circuit can also be controlled by regulating the gate signals impressed to the thyristors 37, 38, 237, 238, 337 and 338 in the manner described. It will further be apparent that the diodes 51, 52, 151, 252, 351 and 352 can be connected in parallel with the respective thyristors 24, 25, 224, 225, 324 and 325 as shown in FIGS. 11, 12, and 15 to 18 respectively, and that the reactor windings 61, 261 and 361 can be connected in series with the respective capacitors 26, 226 and 326 as shown in FIGS. 19 to 21 respectively.

While the various objects of this invention, either explicitly stated or otherise set forth, are belived to be fully accomplished by the preferred embodiments herein disclosed, it will also be understood that the invention itself is not to be restricted by the exact showing of the accompanying drawings and the description thereof. For example, the diodes 28 and 29 can be eliminated from the FIG. 5 embodiment, and the diodes 51 and 52 of this embodiment can likewise be connected with the thyristors 24 and 25 of the other embodiments. It will also be apparent that the thyristors used in this invention can take a variety of forms known to those skilled in the art, and further that the invention is adaptable for polyphase inverters other than those disclosed herein.

All such modifications, substitutions or changes are intended in the foregoing disclosure. It is therefore appropirate that the invention be construed broadly and in a manner consistent with the fair meaning or proper scope of the appended claims.

We claim:

1. An inverter circuit for DC to AC conversion comprising, in combination:
    a DC supply system having positive, neutral, and negative terminals;
    a commuting reactor having a winding connected across said positive and negative terminals of said DC supply system, said winding of said commuting reactor being center tapped to be substantially divided into first and second halves;
    a first thyristor connected between said positive terminal of said DC supply system and said first half of the commuting reactor winding so as to permit current flow from the former to the latter when conductive;
    a second thyristor connected between said second half of said commuting reactor winding and said negative terminal of said DC supply system so as to permit current flow from the former to the latter when conductive;
    a load circuit having first and second terminals, said first terminal of said load circuit being connected to said neutral terminal of said DC supply system;
    a third thyristor connected between said first thyristor and said second terminal of said load circuit so as to permit current flow from the former to the latter when conductive;
    a fourth thyristor connected between said second terminal of said load circuit and said second thyristor so as to permit current flow from the former to the latter when conductive;
    a capacitor connected between the center tap terminal of said commuting reactor winding and said first terminal of said load circuit;
    a first diode connected substantially in parallel with said first thyristor, the direction of current flow through said first diode being opposed to that through said first thyristor;
    a second diode connected substantially in parallel with said second thyristor, the direction of current flow through said second diode being opposed to that through said second thyristor; and
    a source of gate signals connected to the gate electrodes of said first, second, third and fourth thyristors;
    whereby a voltage of positive polarity is delivered to said load circuit when said first and third thyristors are gated conductive, and a voltage of negative polarity is delivered to said load circuit when said second and fourth thyristors are gated conductive.

2. An inverter circuit as recited in claim 1, wherein the gate signals impressed from said source to said third and fourth thyristors have a phase lag with respect to the gate signals impressed to said first and second thyristors, whereby the durations of the output pulses delivered to said load circuit is controlled in accordance with said phase lag.

3. An inverter circuit as recited in claim 1, further comprising a reactor winding connected in series between said capacitor and the center tap terminal of said winding of said commuting reactor.

4. An inverter circuit as recited in claim 1, further comprising a first reactor winding connected in series between said second terminal of said load circuit and said first diode, and a second reactor winding connected in series between said second terminal of said load circuit and said second diode.

5. An inverter circuit for DC to AC conversion comprising, in combination:
    first and second DC input terminals;
    a first commuting reactor having a winding connected across said first and second DC input terminals, said winding of said first commuting reactor being center tapped to be substantially divided into first and second halves;
    a first thyristor connected between said first DC input terminal and said first half of the first commuting reactor winding so as to permit current flow from the former to the latter when conductive;

a second thyristor connected between said second half of said first commuting reactor winding and said second DC input terminal so as to permit current flow from the former to the latter when conductive;

a load circuit having first and second terminals;

a third thyristor connected between said first thyristor and said first terminal of said load circuit so as to permit current flow from the former to the latter when conductive;

a fourth thyristor connected between said first terminal of said load circuit and said second thyristor so as to permit current flow from the former to the latter when conductive;

a first diode connected substantially in parallel with said first thyristor, the direction of current flow through said first diode being opposed to that through said first thyristor;

a second diode connected substantially in parallel with said second thyristor, the direction of current flow through said second diode being opposed to that through said second thyristor;

a second commuting reactor having a winding connected across said first and second DC input terminals, said winding of said second commuting reactor being center tapped to be substantially divided into first and second halves;

a fifth thyristor connected between said first DC input terminal and said first half of the second commuting reactor winding so as to permit current flow from the former to the latter when conductive;

a sixth thyristor connected between said second half of said second commuting reactor winding and said second DC input terminal so as to permit current flow from the former to the latter when conductive;

a seventh thyristor connected between said fifth thyristor and said second terminal of said load circuit so as to permit current flow from the former to the latter when conductive;

an eighth thyristor connected between said second terminal of said load circuit and said sixth thyristor so as to permit current flow from the former to the latter when conductive;

a third diode connected substantially in parallel with said fifth thyristor, the direction of current flow through said third diode being opposed to that through said fifth thyristor;

a fourth diode connected substantially in parallel with said sixth thyristor, the direction of current flow through said fourth diode being opposed to that through said sixth thyristor;

a capacitor connected between the center tap terminal of said first commuting reactor winding and the center tap terminal of said second commuting reactor winding; and a source of gate signals connected to the gate electrodes of said first to eighth thyristors;

whereby a voltage of one polarity is delivered to said load circuit when said first, third, sixth and eighth thyristors are gated conductive, and a voltage of opposite polarity is delivered to said load circuit when said second, fourth, fifth and seventh thyristors are gated conductive.

6. An inverter circuit as recited in claim 5, wherein the phases of the gate signals impressed from said source to the gate electrodes of the respective thyristors are regulated in order to control the durations of the output pulses delivered to said load circuit.

7. An inverter circuit as recited in claim 5, further comprising a reactor winding connected in series with said capacitor.

8. An inverter circuit for DC to AC conversion comprising, in combination:

first and second DC input terminals;

a first commuting reactor having a winding connected across said first and second DC input terminals, said winding of said first commuting reactor being center tapped to be substantially divided into first and second halves;

a first thyristor connected between said first DC input terminal and said first half of the first commuting reactor winding so as to permit current flow from the former to the latter when conductive;

a second thyristor connected between said second half of said first commuting reactor winding and said second DC input terminal so as to permit current flow from the former to the latter when conductive;

a three-phase load circuit having first, second, third, fourth, fifth and sixth terminals;

a third thyristor connected between said first thyristor and said first terminal of said three-phase load circuit so as to permit current flow from the former to the latter when conductive;

a fourth thyristor connected between said first terminal of said three-phase load circuit and said second thyristor so as to permit current flow from the former to the latter when conductive;

a first diode connected substantially in parallel with said first thyristor, the direction of current flow through said first diode being opposed to that through said first thyristor;

a second diode connected substantially in parallel with said second thyristor, the direction of current flow through said second diode being opposed to that through said second thyristor;

a first capacitor connected between the center tap terminal of said first commuting reactor winding and said second terminal of said three-phase load circuit;

a second commuting reactor having a winding connected across said first and second DC input terminals, said winding of said second commuting reactor being center tapped to be substantially divided into first and second halves;

a fifth thyristor connected between said first DC input terminal and said first half of the second commuting reactor winding so as to permit current flow from the former to the latter when conductive;

a sixth thyristor connected between said second half of said second commuting reactor winding and said second DC input terminal so as to permit current flow from the former to the latter when conductive;

a seventh thyristor connected between said fifth thyristor and said third terminal of said three-phase load circuit so as to permit current flow from the former to the latter when conductive;

an eighth thyristor connected between said third terminal of said three-phase load circuit and said sixth thyristor so as to permit current flow from the former to the latter when conductive;

a third diode connected substantially in parallel with said fifth thyristor, the direction of current flow through said third diode being opposed to that through said fifth thyristor;

a fourth diode connected substantially in parallel with said sixth thyristor, the direction of current flow through said fourth diode being opposed to that through said sixth thyristor;

a second capacitor connected between the center tap terminal of said second commuting reactor winding and said fourth terminal of said three-phase load circuit;

a third commuting reactor having a winding connected across said first and second DC input terminals, said winding of said third commuting reactor being center tapped to be substantially divided into first and second halves;

a ninth thyristor connected between said first DC input terminal and said first half of the third commuting reactor winding so as to permit current flow from the former to the latter when conductive;

a tenth thyristor connected between said second half of said third commuting reactor winding and said second DC input terminal so as to permit current flow from the former to the latter when conductive;

an eleventh thyristor connected between said ninth thyristor and said fifth terminal of said three-phase load circuit so as to permit current flow from the former to the latter when conductive;

a twelfth thyristor connected between said fifth terminal of said three-phase load circuit and said tenth thyristor so as to permit current flow from the former to the latter when conductive;

a fifth diode connected substantially in parallel with said ninth thyristor, the direction of current flow through said fifth diode being opposed to that through said ninth thyristor;

a sixth diode connected substantially in parallel with said tenth thyristor, the direction of current flow through said sixth diode being opposed to that through said tenth thyristor;

a third capacitor connected between the center tap terminal of said third commuting reactor winding and said sixth terminal of said three-phase load circuit; and a source of gate signals connected to the gate electrodes of said first to twelfth thyristors;

whereby said first to twelfth thyristors are gated conductive in a predetermined sequence to deliver three-phase AC power to said three-phase load circuit.

9. An inverter circuit as recited in claim 8, wherein the phases of the gate signals impressed from said source to the gate electrodes of the respective thyristors are regulated in order to control the durations of the output pulses delivered to said three-phase load circuit.

10. An inverter circuit as recited in claim 8, further comprising first, second and third reactor windings connected in series with said first, second and third capacitors respectively.

* * * * *